Patented July 25, 1950

UNITED STATES PATENT OFFICE 2,516,259

PROCESS OF OXIDIZING 3,11-DIKETO-17-HYDROXYPREGNANES AND PRODUCT OBTAINED THEREBY

Lewis Hastings Sarett, Princeton, N. J., assignor to Merck & Co., Inc., Rahway, N. J., a corporation of New Jersey No Drawing. Application August 15, 1946, Serial No. 690,823

6 Claims. (Cl. 260—397.3)

This invention is concerned generally with novel chemical compounds of the cyclopentanodimethylpolyhydrophenanthrene series and to processes of preparing the same; more particularly it relates to 3,11,17-triketo-etiocholane and 3,11,20-triketo-17-hydroxy-pregnane, useful as intermediates in the production of compounds having the physiological activity of adrenal cortex hormones, and to syntheses of these compounds from readily available starting materials.

The 3,11,17-triketo-etiocholane and the 3,11,20-triketo-17-hydroxy-pregnane, subject of this application, can be represented by the following structural formulae:

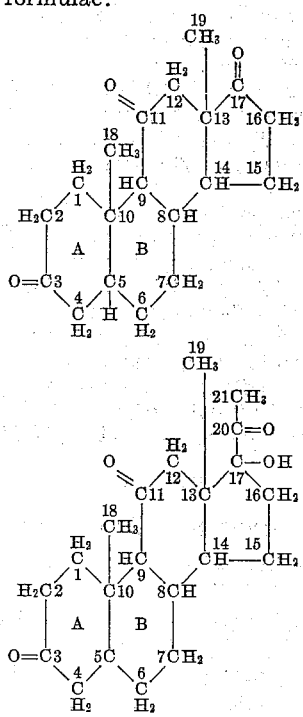

These formulae, for purposes of convenience are hereinafter reproduced below in the abbreviated form:

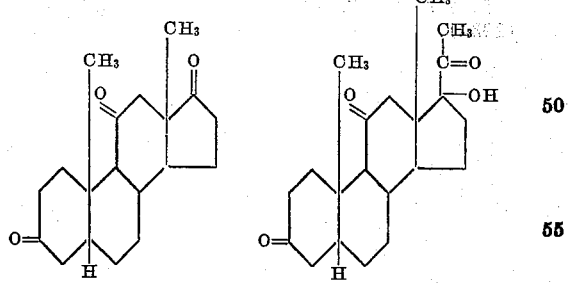

In the following description of the invention, the stereochemical relationship of rings A and B is indicated in the formulae by a solid line rep-resenting the valence bond in the cis configuration.

It is now found that the 3,11,17-triketo-etiocholane and 3,11,20-triketo-17-hydroxy-pregnane can be synthetized by reactions indicated generically as follows:

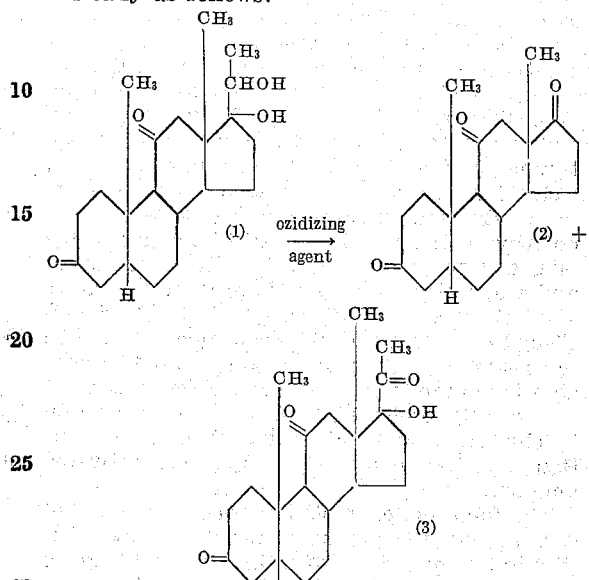

The reactions indicated above are conducted as follows: The starting material, 3,11-diketo-17,20-dihydroxy-pregnane (1), can be prepared from the readily available bile acid, desoxycholic acid, by processes disclosed in my copending applications, Serial No. 649,760, filed February 23, 1946 (which is a continuation-in-part of application Serial No. 605,194, filed July 14, 1945, now abandoned); Serial No. 687,982, filed August 2, 1946, now Patent No. 2,505,838, and Serial No. 683,427, filed June 13, 1946, now Patent No. 2,493,780. This starting material is reacted with an oxidizing agent to produce a mixture comprising 3,11,17-triketo-etiocholane (2) and 3,11,20-triketo-17-hydroxy-pregnane (3).

According to the presently invented process, 3,11-diketo-17,20-dihydroxy-pregnane, which can be represented by the following structural formula:

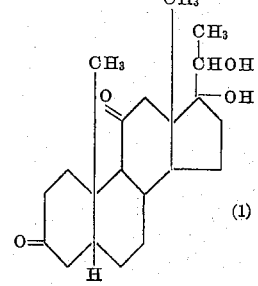

is reacted with an oxidizing agent, as for example, chromic acid, periodic acid, sodium periodate, lead tetracetate, and the like. When chromic acid is employed as the oxidizing agent, the product comprises a mixture of 3,11,20-triketo-17-hydroxy-pregnane and 3,11,17-triketo-etiocholane. The reaction is conveniently carried out in aqueous acidic solution but other media can be employed if desired. It is presently preferred to employ an aqueous solution of a lower aliphatic acid, such as aqueous acetic acid, aqueous propionic acid, and the like. The mixture is allowed to react for a time sufficient to substantially complete the oxidation reaction; when aqueous chromic acid is added to an acetic acid solution of the aforementioned starting materials and the mixture allowed to react at about 20 to 25° C., the time required for substantially complete reaction is about 3 to 4 hours.

A reducing agent, such as sodium sulfite, sodium bisulfite, and the like, is added to reduce any excess oxidizing agent remaining unreacted and the resulting solution is evaporated substantially to dryness to volatilize any aliphatic organic acid used during the oxidation reaction. The residual material is diluted with water and the cyclopentanodimethylpolyhydrophenanthrene product extracted therefrom by means of a chlorinated hydrocarbon solvent such as chloroform, ethylene dichloride, and the like. The chlorinated hydrocarbon extract is shaken with a mild aqueous alkaline solution, then with water and evaporated to dryness to produce a mixture of 3,11,17-triketo-etiocholane and 3,11,20-triketo-17-hydroxy-pregnane. These compounds can be separated from each other and isolated in substantially pure form by any convenient means; it is presently preferred to effect said separation by chromatographic absorption from ether solution of the compounds employing activated alumina.

The following example illustrates a method of carrying out the presently invented process but it is to be understood that this example is given by way of illustration and not of limitation.

*Example*

About 300 mg. of 3,11-diketo-17,20-dihydroxy-pregnane is dissolved in about 30 cc. of glacial acetic acid and the solution is treated with a solution containing about 150 mg. of chromic acid in about 3.0 cc. of water. The mixture is allowed to stand at room temperature for approximately 3½ hours and is then treated with sufficient sodium sulfite to destroy excess chromic acid; the resulting solution is then evaporated to dryness under reduced pressure, the residue is diluted with water and extracted with chloroform. The chloroform extract is washed first with dilute aqueous potassium carbonate solution and then with water and is then evaporated to dryness under reduced pressure. The residue is dissolved in ether or in a mixture of ether and chloroform and is separated chromatographically using activated alumina. The first fractions contain 3,11,17-triketo-etiocholane which is purified by recrystallization from dilute methanol and from ether; M. P. 134–135° C. (corr.); $\alpha_D = +155°$ (acetone).

The latter fractions from the chromatogram contain 3,11,20 - triketo - 17 - hydroxy-pregnane which is purified by crystallization from dilute acetone; M. P. 205–206° C. (corr.); $\alpha_D = +75°$ (acetone).

I claim:

1. The process which comprises reacting 3,11-diketo - 17,20 - dihydroxy - pregnane with a considerable excess of an oxidizing agent selected from the class which consists of chromic acid, periodic acid, sodium periodate and lead tetraacetate, to produce a mixture comprising 3,11,17-triketo - etiocholane and 3,11,20 - triketo - 17 - hydroxy-pregnane.

2. The process which comprises reacting 3,11-diketo-17,20-dihydroxy-pregnane with chromic acid to produce a mixture containing 3,11,17-triketo - etiocholane and 3,11,20 - triketo - 17 - hydroxy-pregnane and isolating substantially pure 3,11,17 - triketo - etiocholane and 3,11,20 - triketo-17-hydroxy-pregnane therefrom.

3. The process which comprises reacting 3,11,20-triketo-17-hydroxy-pregnane with a considerable excess of an oxidizing agent selected from the class which consists of chromic acid, periodic acid, sodium periodate and lead tetraacetate, to produce 3,11,17-triketo-etiocholane.

4. The process which comprising reacting 3,11-diketo-17,20-dihydroxy-pregnane with chromic acid to produce 3,11,20-triketo-17-hydroxy-pregnane.

5. The process which comprises reacting 3,11-diketo-17,20-dihydroxy-pregnane with chromic acid in glacial acetic acid to produce a mixture containing 3,11,17 - triketo - etiocholane and 3,11,20-triketo-17-hydroxy-pregnane; and separating these compounds from each other by chromatographic absorption.

6. 3,11,20 - triketo - 17 - hydroxy - pregnane, having a melting point of about 205–206° C. and an $\alpha_D$ approximately equal to $+75°$ in acetone.

LEWIS HASTINGS SARETT.

REFERENCES CITED

The following references are of record in the file of this patent:

UNITED STATES PATENTS

| Number | Name | Date |
| --- | --- | --- |
| 2,256,500 | Serini | Sept. 23, 1941 |
| 2,275,790 | Miescher | Mar. 10, 1942 |
| 2,389,325 | Reichstein | Nov. 20, 1945 |

OTHER REFERENCES

Mason, "Jour. Biol. Chem.," 124, pages 461, 469 (1938).